US008886894B2

(12) United States Patent
Adl-Tabatabai et al.

(10) Patent No.: US 8,886,894 B2
(45) Date of Patent: Nov. 11, 2014

(54) MECHANISMS TO ACCELERATE TRANSACTIONS USING BUFFERED STORES

(71) Applicant: Intel Corporation, Santa Clara, CA (US)

(72) Inventors: Ali-Reza Adl-Tabatabai, San Jose, CA (US); Yang Ni, Sunnyvale, CA (US); Bratin Saha, Santa Clara, CA (US); Vadim Bassin, Raanana (IL); Gad Sheaffer, Haifa (IL); David Callahan, Seattle, WA (US); Jan Gray, Belluvue, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/658,264

(22) Filed: Oct. 23, 2012

(65) Prior Publication Data

US 2013/0046925 A1 Feb. 21, 2013

Related U.S. Application Data

(62) Division of application No. 12/638,054, filed on Dec. 15, 2009, now Pat. No. 8,316,194.

(51) Int. Cl.
*G06F 12/16* (2006.01)
(52) U.S. Cl.
USPC .... 711/154; 711/141; 711/162; 711/E12.001; 711/E12.026; 718/101
(58) Field of Classification Search
USPC .......... 711/154, 141, 162, E12.001, E12.026; 718/101
See application file for complete search history.

(56) References Cited

U.S. PATENT DOCUMENTS

| 6,243,778 | B1 | 6/2001 | Fung |
| 6,571,332 | B1 | 5/2003 | Miranda et al. |
| 6,640,285 | B1 | 10/2003 | Boparkikar et al. |
| 6,978,396 | B2 | 12/2005 | Ruuth et al. |
| 7,127,561 | B2 | 10/2006 | Hill |
| 7,313,764 | B1 | 12/2007 | Brunner et al. |
| 7,395,382 | B1 | 7/2008 | Moir |
| 7,502,897 | B2 | 3/2009 | Hertzberg et al. |
| 7,542,977 | B2 | 6/2009 | Hudson et al. |
| 7,836,450 | B2 | 11/2010 | Kissell |
| 2002/0108025 | A1 | 8/2002 | Shaylor |
| 2004/0260972 | A1 | 12/2004 | Ji et al. |

(Continued)

FOREIGN PATENT DOCUMENTS

WO    WO 2010/151267 A1    12/2010

OTHER PUBLICATIONS

U.S. Patent and Trademark Office, Office Action mailed Nov. 23, 2012 with Reply filed Feb. 18, 2013 in U.S. Appl. No. 12/638,064.

(Continued)

*Primary Examiner* — Yong Choe
(74) *Attorney, Agent, or Firm* — Trop, Pruner & Hu, P.C.

(57) ABSTRACT

In one embodiment, the present invention includes a method for executing a transactional memory (TM) transaction in a first thread, buffering a block of data in a first buffer of a cache memory of a processor, and acquiring a write monitor on the block to obtain ownership of the block at an encounter time in which data at a location of the block in the first buffer is updated. Other embodiments are described and claimed.

18 Claims, 8 Drawing Sheets

(56) References Cited

U.S. PATENT DOCUMENTS

| | | |
|---|---|---|
| 2005/0086446 A1 | 4/2005 | McKenney et al. |
| 2006/0294326 A1 | 12/2006 | Quinn |
| 2007/0143287 A1 | 6/2007 | Adl-tabatabai et al. |
| 2007/0156780 A1 | 7/2007 | Saha et al. |
| 2007/0156994 A1 | 7/2007 | Akkary et al. |
| 2007/0162520 A1 | 7/2007 | Petersen |
| 2007/0186056 A1 | 8/2007 | Saha et al. |
| 2007/0239943 A1 | 10/2007 | Dice et al. |
| 2008/0010532 A1 | 1/2008 | Lev et al. |
| 2008/0162881 A1 | 7/2008 | Welc et al. |
| 2008/0162885 A1 | 7/2008 | Wang et al. |
| 2008/0162990 A1 | 7/2008 | Wang et al. |
| 2008/0256073 A1 | 10/2008 | Detlefs et al. |
| 2008/0270745 A1 | 10/2008 | Saha et al. |
| 2009/0089520 A1 | 4/2009 | Bratin et al. |
| 2009/0144524 A1 | 6/2009 | Shen et al. |
| 2013/0046924 A1 | 2/2013 | Adl-Tabatabai et al. |
| 2013/0046947 A1 | 2/2013 | Adl-Tabatabai et al. |

OTHER PUBLICATIONS

Wang, Shaogang, et al., "Software Assisted Transact Cache to Support Efficient Unbounded Transactional Memory", Sep. 2008, IEEE, 10th IEEE Intl. Conf. on High Performance Computing and Communications. pp. 77-84.

Wang, Chun Yao and D.J. Buehrer, Ring Based Decentralized Collaborative Non-Blocking Atomic Commit Protocol, 2008, IEEE, 2008 IEEE WIC/ACM Intl. Conf. on Web Intelligence and Intelligent Agent Technology, pp. 395-398.

U.S. Patent and Trademark Office, Notice of Allowance mailed Apr. 29, 2013 in U.S. Appl. No. 12/638,064.

Patent Cooperation Treaty, Notification of Transmittal of the International Search Report and the Written Opinion of the International Searching Authority mailed Jun. 24, 2011 in international application No. PCT/US2010/056142.

U.S. Patent and Trademark Office, Office Action mailed Mar. 7, 2011 with Reply filed Jun. 6, 2011 in U.S. Appl. No. 12/638,181.

Stenstrom, P., "A Survey of Cache Coherence Schemes for Multiprocessors," Computer, vol. 23, Issue 6, Jun. 1990, pp. 12-24.

Rajwar, R., et al., "Virtualizing Transactional Memory," ACM SIGARCH Computer Architecture News, vol. 33, Issue 2, May 2005, pp. 494-505.

Lie, S., "An Integrated Hardware-Software Approach to Transactional Memory," 6.895 Theory of Parallel Systems, Presentation, Dec. 8, 2003.

Lie, S., et al., "An Integrated Hardware-Software Approach to Transactional Memory," MIT Computer Science and Artificial Intelligence Laboratory, Feb. 2004, pp. 1-2.

Hewlett-Packard Development Company, "Memory-Relevant Portions of the Processor," Sep. 18, 2005.

State Intellectual Property Office, P.R. China, First Office Action issued Mar. 1, 2010, in Chinese application serial No. 200680046532.2.

Moir, M,, "Hybrid Transactional Memory," Announcement Sun Microsystems, Jul. 2005, pp. 1-15.

Stonebraker, M., "Virtual Memory Transaction Management," Operating Systems Review USA, vol. 18, No. 2, Apr. 1984, pp. 8-16.

Chang, A., et al., "801 Storage: Architecture and Programming," ACM Transactions on Computer Systems, ACM, New York NY, US, vol. 6, No. 1.1, Feb. 1988, pp. 28-50.

Lev Y., et al., "Towards a Safer Interaction with Transactional Memory by Tracking Object Visibility," Proceedings of Synchronization and Concurrency in Object-Oriented Languages (SCOOL), OOPSLA 2005 Workshop, Oct. 7, 2005, pp. 31-38.

Lie, S., "Hardware Support for Unbounded Transactional Memory," Master's Thesis, MIT Department of Electrical Engineering and Computer Science, May 7, 2004, pp. 1, 3, 7, 8, 85-102.

International Preliminary Report on Patentability (IPRP), Jun. 26, 2008, for International Application No. PCT/US2006/046499, 7 pages.

Moir M., "Hybrid Hardware/Software Transactional Memory," Sun Microsystems, Apr. 8, 2005, 21 pages.

PCT International Search Report and Written Opinion, Jun. 12, 2007 for International Application No. PCT/US2006/046499, 11 pages.

Sukha, J., "Memory-Mapped Transactions," Master's Thesis, MIT Department of Electrical Engineering and Computer Science, Jun. 2005, 92 pages.

Ennals, R., "Software Transactional Memory Should Not Be Obstruction-Free," Sep. 14, 2005.

Harris, T., et al., "Language Support for Lightweight Transactions," Proceedings of the 18th Annual ACM SIGPLAN Conference on Object-oriented Programming, Systems, Languages, and Applications, Oct. 2003, pp. 388-402.

Herlihy, M, et al., "Transaction Memory: Architectural Support for Lock-Free Data Structures," Proceedings of the 20th Annual International Symposium on Computer Architecture, 1993, pp. 289-300.

Arrvindh Shriraman, et al., "Hardware Acceleration of Software Transactional Memory," May 18, 2006, pp. 1-10.

Sanjeev Kumar, et al., "Hybrid Transactional Memory," Mar. 29-31, 2006, pp. 1-28.

Bratin Saha, et al., "Architectural Support for Software Transactional Memory," Dec. 9-13, 2006, pp. 1-12.

Peter Damron, et al., "Hybrid Transactional Memory," Oct. 21-25, 2006, pp. 1-11.

U.S. Appl. No. 12/638,064, filed Dec. 15, 2009, entitled "Handling Operating System (OS) Transitions in an Unbounded Transactional Memory (UTM) Mode," by Koichi Yamada, et al.

U.S. Appl. No. 12/638,181, filed Dec. 15, 2009, entitled "Performing Mode Switching in an Unbounded Transactional Memory (UTM) System," by Jan Gray, et al.

Dave Dice, et al, "Transactional Locking II," 2006, pp. 1-15.

Korean Intellectual Property Office, Office Action mailed Jul. 24, 2013 in Korean application No. 10-2012-7018479.

European Patent Office, "Extended European Search Report," mailed Jan. 8, 2014, in European application No. 10841433.5-1957/2513779 PCT/US2010056142.

MECHANISMS TO ACCELERATE TRANSACTIONS USING BUFFERED STORES

This application is a divisional of U.S. patent application Ser. No. 12/638,054, filed Dec. 15, 2009, which is now U.S. Pat. No. 8,316,194, issued Nov. 20, 2012, the content of which is hereby incorporated by reference.

BACKGROUND

Software transactional memory (STM) systems require a version management mechanism that maintains multiple versions of data modified inside transactions. Two version management approaches exist, each of which has overheads when implemented in software. A first approach is referred to as eager versioning, in which a new data value is written in place and an old value is stored in an undo log in case of rollback. This approach has two overheads: maintaining the undo log on each write and restoring values from the undo log on rollback. Some language-level TM memory models preclude the use of eager versioning because it makes speculative values visible to non-transactional accesses.

A second approach is referred to as lazy versioning, in which new data values are written into a software write buffer and are then copied to their destination locations on commit. This approach has three overheads: maintaining the software write buffer, looking up values in the software write buffer on reads, and copying values from the software write buffer on commit. Lazy versioning can lock written data at either encounter time or commit time, whereas eager versioning can lock only at encounter time. As seen for either approach, significant overhead for version management exists for an STM system.

DETAILED DESCRIPTION

Using embodiments of the present invention, hardware support may be provided to buffer values to accelerate version management for transactions having a write set that fits in a hardware buffer (e.g., a cache or other limited size hardware buffer). By buffering transactional writes in a cache, lazy versioning can be performed in hardware, eliminating the overhead of software version management and thus accelerating software transactional memory systems.

Embodiments may further be used to accelerate software transactional memory systems that perform both eager and lazy versioning and can be combined with hardware support for cache-resident and unbounded read sets. In one embodiment, an explicit buffered store instruction (which may be a user-level instruction of an instruction set architecture (ISA)) may be used to store a transactional write in a cache. In addition, an explicit write monitor instruction (which may be a different user-level instruction of the ISA) may be used to acquire exclusive ownership of the buffered cache lines, either at the same time as a buffered store (encounter-time write monitoring) or at commit time (commit-time write monitoring). In some implementations, a single instruction may be used to perform both the buffered write and write monitor. These user-level instructions and other techniques in accordance with an embodiment of the present invention can be used both for native code and object-based systems.

As will be described further below, monitoring is a hardware feature that may be used by software to support faster conflict detection, i.e., conflicts between two transactions that are trying to run in parallel. In general, monitoring may provide similar functionality to a software lock with lower cost. Each partition (monitor block) of physical memory may have a private read monitor and write monitor for each thread. Alternately, write barriers may be performed implicitly in hardware. Locking and write monitoring of an accessed data value may be performed at encounter-time or commit-time, in different implementations. Note that the loss of any buffered line (e.g., due to cache overflow or a conflicting access by another transaction) causes the transaction to abort and restart.

Figure 1:
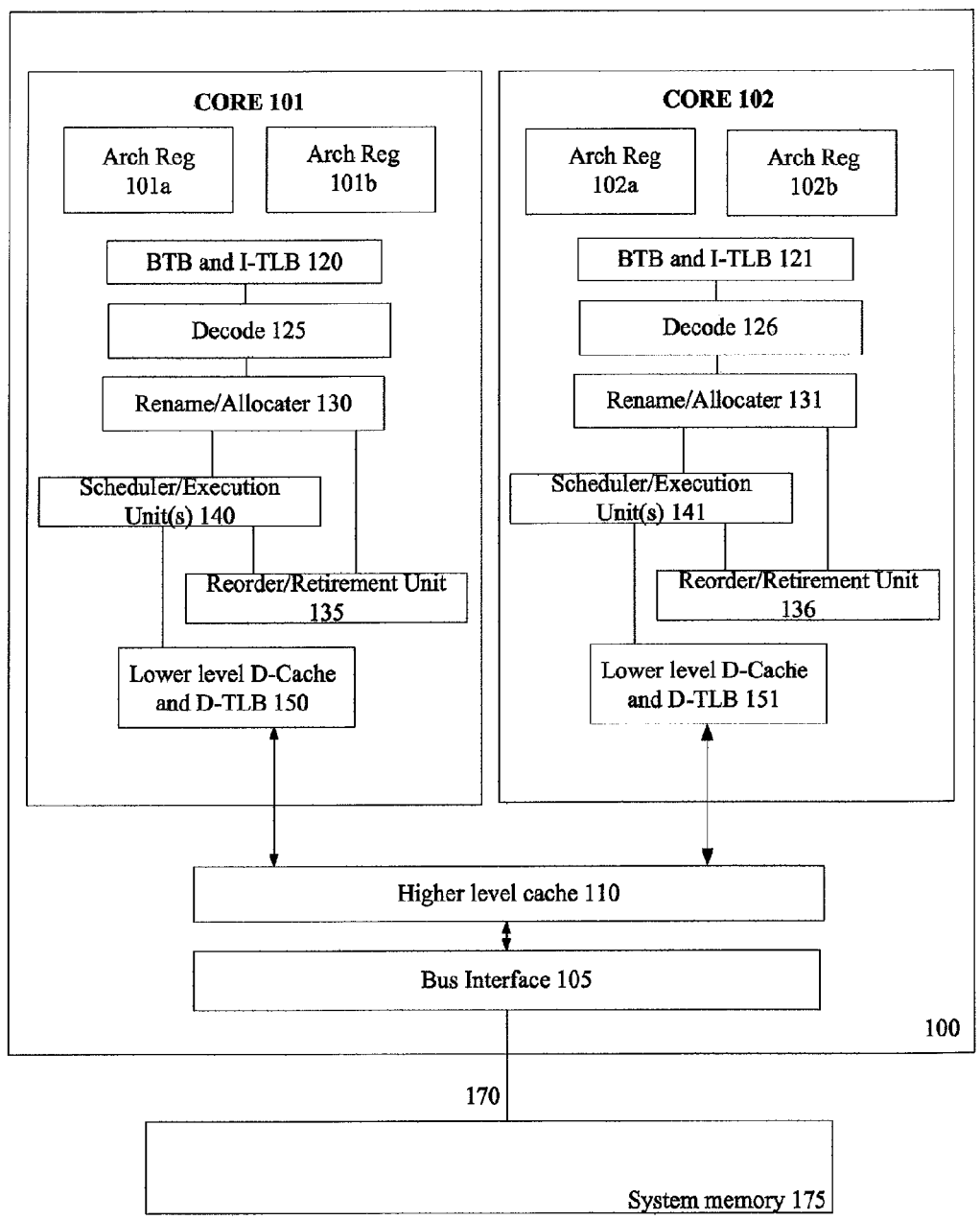
FIG. 1 is a block diagram of a processor in accordance with one embodiment of the present invention.

As background of implementations that can be used in an unbounded TM (UTM) system, it is instructive to look at example hardware that can be used for UTM transactions. In general, a UTM transaction enables use of hardware in connection with transactions that can be fully implemented in hardware, namely cache resident transactions, and unbounded transactions that execute using a combination of hardware and software. Referring to FIG. 1, an embodiment of a processor capable of executing multiple threads concurrently is illustrated. Note, processor 100 may include hardware support for hardware transactional execution. Either in conjunction with hardware transactional execution, or separately, processor 100 may also provide hardware support for hardware acceleration of a STM, separate execution of a STM, or a combination thereof, e.g., UTM in accordance with an embodiment of the present invention. Processor 100 may be any type of processor, such as a micro-processor, an embedded processor, a digital signal processor (DSP), a network processor, or other device to execute code. Processor 100, as illustrated, includes a plurality of processing elements.

Physical processor 100, as illustrated in FIG. 1, includes two cores, core 101 and 102, which share access to higher level cache 110. Although processor 100 may include asymmetric cores, i.e., cores with different configurations, functional units, and/or logic, symmetric cores are illustrated. As a result, core 102, which is illustrated as identical to core 101, will not be discussed in detail to avoid repetitive discussion. In addition, core 101 includes two hardware threads 101a and 101b, while core 102 includes two hardware threads 102a and 102b. Therefore, software entities, such as an operating system, potentially view processor 100 as four separate processors, i.e., four logical processors or processing elements capable of executing four software threads concurrently.

Here, a first thread is associated with architecture state registers 101a, a second thread is associated with architecture state registers 101b, a third thread is associated with architecture state registers 102a, and a fourth thread is associated with architecture state registers 102b. As illustrated, architecture state registers 101a are replicated in architecture state registers 101b, so individual architecture states/contexts are capable of being stored for logical processor 101a and logical processor 101b. The architecture state registers may, in one embodiment, include registers for use in implementing UTM transaction, e.g., a transaction status register (TSR), transaction control register (TCR), and an ejection instruction pointer register to identify a location of an ejection handler that can be used to handle events occurring during a transaction (such as an abort of a transaction).

Other smaller resources, such as instruction pointers and renaming logic in rename allocator logic 130 may also be replicated for threads 101a and 101b. Some resources, such as re-order buffers in reorder/retirement unit 135, instruction translation lookaside buffer (ITLB) 120, load/store buffers, and queues may be shared through partitioning. Other resources, such as general purpose internal registers, page-table base register, low-level data-cache and data-TLB 115, execution unit(s) 140, and portions of out-of-order unit 135 are potentially fully shared.

As illustrated, processor 100 includes bus interface module 105 to communicate with devices external to processor 100, such as system memory 175, a chipset, a northbridge, or other integrated circuit. Memory 175 may be dedicated to processor 100 or shared with other devices in a system. Higher-level or further-out cache 110 is to cache recently fetched elements from higher-level cache 110. Note that higher-level or further out refers to cache levels increasing or getting further way from the execution unit(s). In one embodiment, higher-level cache 110 is a second-level data cache. However, higher level cache 110 is not so limited, as it may be associated with or include an instruction cache. A trace cache, i.e., a type of instruction cache, may instead be coupled after decoder 125 to store recently decoded traces. Module 120 also potentially includes a branch target buffer to predict branches to be executed/taken and a ITLB to store address translation entries for instructions.

Decode module 125 is coupled to fetch unit 120 to decode fetched elements. In one embodiment, processor 100 is associated with an ISA, which defines/specifies instructions executable on processor 100. Here, often machine code instructions recognized by the ISA include a portion of the instruction referred to as an opcode, which references/specifies an instruction or operation to be performed.

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 100 is capable of hardware transactional execution, software transactional execution, or a combination or hybrid thereof. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, these instructions are part of a set of instructions, such as an ISA, which are recognizable by hardware of processor 100, such as decoders described above. Often, these instructions, once compiled from a high-level language to hardware recognizable assembly language include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e., pending.

In one embodiment, processor 100 is capable of executing transactions utilizing hardware/logic, i.e., within a Hardware Transactional Memory (HTM) system. Numerous specific implementation details exist both from an architectural and microarchitectural perspective when implementing an HTM; most of which are not discussed herein to avoid unnecessarily obscuring embodiments of the invention. However, some structures and implementations are disclosed for illustrative purposes. Yet, it should be noted that these structures and implementations are not required and may be augmented and/or replaced with other structures having different implementation details.

In general, processor 100 may be capable of executing transactions within a UTM system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software. The same hardware may also be utilized to support and accelerate a pure STM system.

As stated above, transactions include transactional memory accesses to data items both by local processing elements within processor 100, as well as potentially by other processing elements. Without safety mechanisms in a transactional memory system, some of these accesses would potentially result in invalid data and execution, i.e., a write to data invalidating a read, or a read of invalid data. As a result, processor 100 may include logic to track or monitor memory accesses to and from data items for identification of potential conflicts, such as read monitors and write monitors, as discussed below.

In one embodiment, processor 100 includes monitors to detect or track accesses, and potential subsequent conflicts, associated with data items. As one example, hardware of processor 100 includes read monitors and write monitors to track loads and stores, which are determined to be monitored, accordingly. As an example, hardware read monitors and write monitors are to monitor data items at a granularity of the data items despite the granularity of underlying storage structures. In one embodiment, a data item is bounded by tracking mechanisms associated at the granularity of the storage structures to ensure that at least the entire data item is monitored appropriately.

As a specific illustrative example, read and write monitors include attributes associated with cache locations, such as locations within lower level data cache 150, to monitor loads from and stores to addresses associated with those locations. Here, a read attribute for a cache location of data cache 150 is set upon a read event to an address associated with the cache location to monitor for potential conflicting writes to the same address. In this case, write attributes operate in a similar manner for write events to monitor for potential conflicting reads and writes to the same address. To further this example, hardware is capable of detecting conflicts based on snoops for reads and writes to cache locations with read and/or write attributes set to indicate the cache locations are monitored, accordingly. Inversely, setting read and write monitors, or updating a cache location to a buffered state, in one embodiment, results in snoops, such as read requests or read for ownership requests, which allow for conflicts with addresses monitored in other caches to be detected.

Therefore, based on the design, different combinations of cache coherency requests and monitored coherency states of cache lines result in potential conflicts, such as a cache line holding a data item in a shared read monitored state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting, as well as status registers to report the conflicts.

However, any combination of conditions and scenarios may be considered invalidating for a transaction, which may be defined by an instruction, such as a commit instruction. Examples of factors that may be considered for non-commit of a transaction include detecting a conflict to a transactionally accessed memory location, losing monitor information, losing buffered data, losing metadata associated with a transactionally accessed data item, and detecting an other invalidating event, such as an interrupt, ring transition, or an explicit user instruction (assuming that a resumed transaction cannot be continued).

In one embodiment, hardware of processor 100 is to hold transactional updates in a buffered manner. As stated above, transactional writes are not made globally visible until commit of a transaction. However, a local software thread associated with the transactional writes is capable of accessing the transactional updates for subsequent transactional accesses. As a first example, a separate buffer structure is provided in processor 100 to hold the buffered updates, which is capable of providing the updates to the local thread and not to other external threads. Yet, the inclusion of a separate buffer structure is potentially expensive and complex.

In contrast, as another example, a cache memory, such as data cache 150, is utilized to buffer the updates, while providing the same transactional functionality. Here, cache 150 is capable of holding data items in a buffered coherency state; in one case, a new buffered coherency state is added to a cache coherency protocol, such as a Modified Exclusive Shared Invalid (MESI) protocol to form a MESIB protocol. In response to local requests for a buffered data item, namely a data item being held in a buffered coherency state, cache 150 provides the data item to the local processing element to ensure internal transactional sequential ordering. However, in response to external access requests, a miss response is provided to ensure the transactionally updated data item is not made globally visible until commit. Furthermore, when a line of cache 150 is held in a buffered coherency state and selected for eviction, the buffered update is not written back to higher level cache memories—the buffered update is not to be proliferated through the memory system, i.e., not made globally visible, until after commit. Upon commit, the buffered lines are transitioned to a modified state to make the data item globally visible.

Note that the terms internal and external are often relative to a perspective of a thread associated with execution of a transaction or processing elements that share a cache. For example, a first processing element for executing a software thread associated with execution of a transaction is referred to a local thread. Therefore, in the discussion above, if a store to or load from an address previously written by the first thread, which results in a cache line for the address being held in a buffered coherency state, is received, then the buffered version of the cache line is provided to the first thread since it is the local thread. In contrast, a second thread may be executing on another processing element within the same processor, but is not associated with execution of the transaction responsible for the cache line being held in the buffered state—an external thread; therefore, a load or store from the second thread to the address misses the buffered version of the cache line, and normal cache replacement is utilized to retrieve the unbuffered version of the cache line from higher level memory.

Here, the internal/local and external/remote threads are being executed on the same processor, and in some embodiments, may be executed on separate processing elements within the same core of a processor sharing access to the cache. However, the use of these terms is not so limited. As stated above, local may refer to multiple threads sharing access to a cache, instead of being specific to a single thread associated with execution of the transaction, while external or remote may refer to threads not sharing access to the cache.

As stated above in the initial reference to FIG. 1, the architecture of processor 100 is purely illustrative for purpose of discussion. For example, in other embodiments UBT hardware can be implemented for a processor with a much simpler in-order execution processor design, which may not include complex rename/allocator and reorder/retirement units. Similarly, the specific examples of translating data addresses for referencing metadata is also exemplary, as any method of associating data with metadata in separate entries of the same memory may be utilized.

Figure 2:
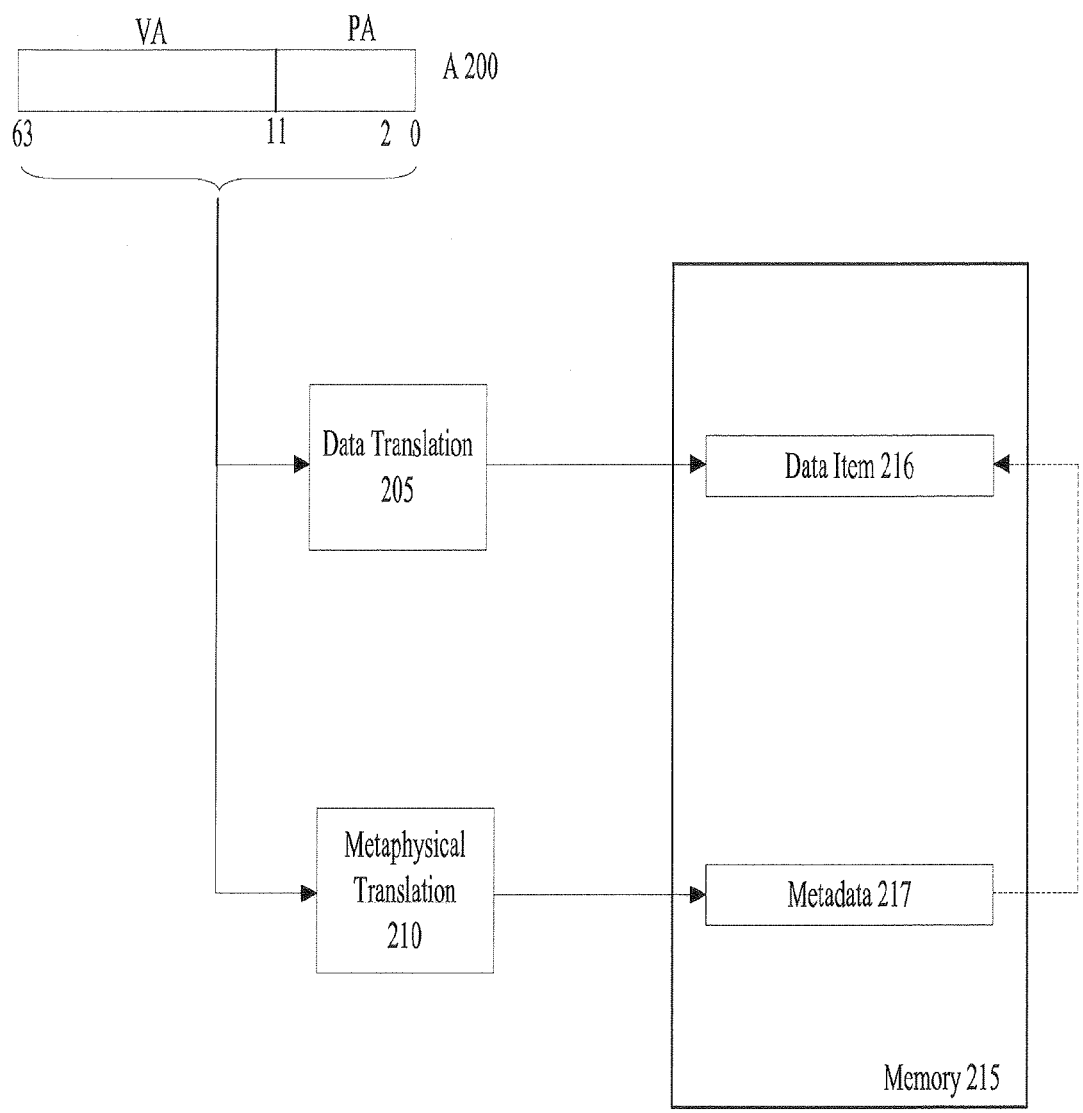
FIG. 2 is a block diagram of holding metadata for a data item in a processor in accordance with one embodiment of the present invention.

Turning to FIG. 2, an embodiment of holding metadata for a data item in a processor is illustrated. As depicted, metadata 217 for data item 216 is held locally in memory 215. Metadata includes any property or attribute associated with data item 216, such as transactional information relating to data item 216. Some illustrative examples of metadata are included below; yet the disclosed examples of metadata are purely illustrative. As such, metadata location 217 may hold any combination of information and other attributes for data item 216.

As a first example, metadata 217 includes a reference to a backup or buffer location for transactionally written data item 216, if data item 216 has been previously accessed, buffered and/or backed up within a transaction. Here, in some implementations a backup copy of a previous version of data item 216 is held in a different location, and as a result, metadata 217 includes an address, or other reference, to the backup location. Alternatively, metadata 217 itself may act as a backup or buffer location for data item 216.

As another example, metadata 217 includes a filter value to accelerate repeat transactional accesses to data item 216. Often, during execution of a transaction utilizing software, access barriers are performed at transactional memory accesses to ensure consistency and data validity. For example, before a transactional load operation a read barrier is executed to perform read barrier operations, such as testing if data item 216 is unlocked, determining if a current read set of the transaction is still valid, updating a filter value, and logging of version values in the read set for the transaction to enable later validation. However, if a read of that location has already been performed during execution of the transaction, then the same read barrier operations are potentially unnecessary.

As a result, one solution includes utilizing a read filter to hold a first default value to indicate data item 216, or the address therefore, has not been read during execution of the transaction and a second accessed value to indicate that data item 216, or the address therefore, has already been accessed during a pendency of the transaction. Essentially, the second accessed value indicates whether the read barrier should be accelerated. In this instance, if a transactional load operation is received and the read filter value in metadata location 217 indicates that data item 216 has already been read, then, in one embodiment, the read barrier is elided—not executed—to accelerate the transactional execution by not performing unnecessary, redundant read barrier operations. Note that a write filter value may operate in the same manner with regard to write operations. However, individual filter values are purely illustrative, as, in one embodiment, a single filter value is utilized to indicate if an address has already been accessed—whether written or read. Here, metadata access operations to check metadata 217 for 216 for both loads and stores utilize the single filter value, which is in contrast to the examples above where metadata 217 includes a separate read filter value and write filter value. As a specific illustrative embodiment, four bits of metadata 217 are allocated to a read filter to indicate if a read barrier is to be accelerated in regards to an associated data item, a write filter to indicate if a write barrier is to be accelerated in regards to an associated data item, an undo filter to indicate undo operations are to be accelerated, and a miscellaneous filter to be utilized in any manner by software as a filter value.

A few other examples of metadata include an indication of, representation of, or a reference to an address for a handler—either generic or specific to a transaction associated with data item 216, an irrevocable/obstinate nature of a transaction associated with data item 216, a loss of data item 216, a loss of monitoring information for data item 216, a conflict being detected for data item 216, an address of a read set or read entry within a read set associated with data item 216, a previous logged version for data item 216, a current version of data item 216, a lock for allowing access to data item 216, a version value for data item 216, a transaction descriptor for the transaction associated with data item 216, and other known transaction related descriptive information. Furthermore, as described above, use of metadata is not limited to transactional information. As a corollary, metadata 217 may also include information, properties, attributes, or states associated with data item 216, which are not involved with a transaction.

Figure 3A:
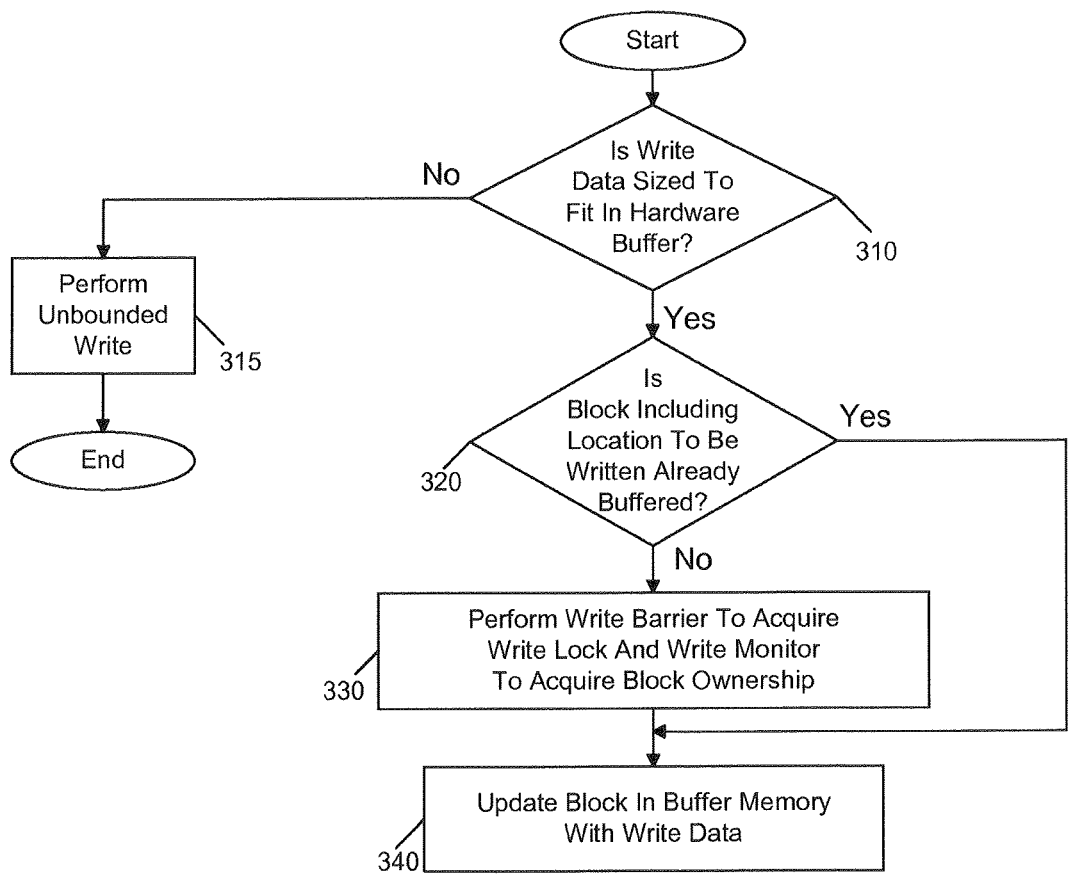
FIG. 3A is a flow diagram of a method for performing eager write locking and monitoring in accordance with one embodiment of the present invention.

As described above, embodiments may use an explicit write buffered instruction to perform a write to a hardware buffer. In one implementation, a write barrier may be used to buffer updates in hardware using this explicit buffered store instruction. Referring now to FIG. 3A, shown is a flow diagram of a method for performing eager write locking and monitoring in accordance with one embodiment of the present invention. More specifically, FIG. 3A shows a method for performing a transaction in which eager write locking and monitoring is performed. While these eager operations are in the context of a cache resident TM transaction, understand that the scope of the present invention is not limited in this regard. As seen, method 300 may begin by determining whether data to be written in the transaction is sized to fit in a hardware buffer (diamond 310). As an example, this determination may be made based on a size of a memory block to be written in the transaction and a corresponding amount of available storage in a cache memory. In one embodiment, the cache may be any level of a cache hierarchy of a processor, including a shared cache, although other implementations may limit this analysis to a private cache of a core on which a given TM thread is executing. Of course other embodiments can provide for hardware write buffering in a separate hardware structure. If the write data is not sized to fit in the hardware buffer, control may pass to block 315, where an unbounded write transaction can be performed. While this UTM transaction may gain assistance from hardware properties including monitoring and buffering, the implementation described herein with respect to FIG. 3A is with respect to a cache resident transaction. Other embodiments may apply to transactions having a writes set that fits within a hardware buffer used to implement write buffering.

If the data is sized to fit in the hardware buffer, control passes from diamond 310 to diamond 320 where it may be determined whether a block including the location to be written has already been buffered in the cache. This determination may thus perform a filtering function to avoid the expense of performing a write barrier. In different implementations, various manners of performing the filtering may be realized. In many embodiments one or more hardware properties may be used to perform the filtering. In the implementations discussed herein, a buffered property may be used. In one embodiment, a user-level test instruction may be used to determine whether the address of the corresponding write data is buffered in the cache. This determination may be made based on a buffered indicator associated with a block including the address of the data. Thus, the determination at diamond 320 may prevent or filter a write barrier if the block is already present in the cache. In other embodiments, it is possible to use write monitoring to perform filtering in an eager write monitoring implementation.

Otherwise, if the block to be written to has not already been buffered, control may pass to block 330 where a write barrier operation may be performed. More specifically, this write barrier operation may be an eager write barrier in which both a write lock and a write monitor are acquired to obtain ownership of the block. Different implementations of write locks and write monitors may be realized. However, for purposes of generality understand that the write lock may be a software write lock, e.g., a write lock present in memory and associated with the particular location to be written. In contrast, the write monitor may be a hardware monitor which may be on the granularity of a monitored block size which, in one embodiment may be cache line size. As one example of a write monitoring property, state information of a cache line may include a write monitor indicator (e.g., a monitor bit) that can be set to indicate that a given thread has obtained a write monitor on the cache line. In some embodiments multiple such monitors may be associated with a given cache line, each corresponding to a different thread. Accordingly at this time the write barrier is completed and control passes to block 340. At block 340, the buffered block may be updated with the data to be written. This update may occur directly to the block in the buffer as a write monitor and lock have been acquired on the block. While not shown in FIG. 3A, understand that at this time additional operations in the course of the transaction may occur.

Figure 3B:
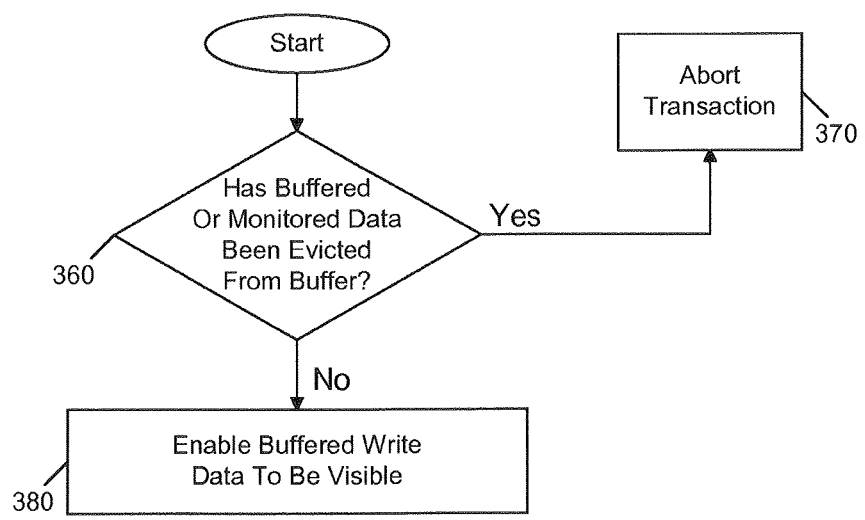
FIG. 3B is a flow diagram of a method for performing transaction commit in an eager write monitoring and locking transaction in accordance with one embodiment of the present invention.

Referring now to FIG. 3B, shown is a flow diagram of a method for performing transaction commit in an eager write monitoring and locking transaction. As shown in FIG. 3B, at commit, control passes to diamond 360, where it may be determined whether any buffered or monitored data has been evicted from the buffer. Note that this determination may be on a transaction basis, and is not limited to the block that was updated. The determination of whether a line has been evicted can take different forms. However, in a hardware assisted system, information present, e.g., in a transaction status register may be checked to determine whether a loss of monitoring or buffering has occurred, e.g., by the analysis of one or more loss event indicators of the TSR. If such a loss has occurred, the transaction may be aborted (block 370). Control may then pass to, e.g., a TM runtime system (such as ejection handler of the runtime system) to determine whether the transaction should be re-executed and if so, a transaction execution mode in which the re-execution should occur.

If instead it is determined that no buffered or monitored data has been evicted, control passes instead from diamond 360 to block 380, where the buffered write data may be enabled to be visible (block 380). That is, the transaction may commit and the buffered data may be indicated to be globally observed. For example, information regarding a cache coherency state of the buffered data may be updated to indicate its transition from hidden or private use by the thread executing the transaction to a shared state in which it can be accessed by other agents. While shown with this particular implementation in the embodiment of FIG. 3B, understand the scope of the present invention is not limited in this regard.

Table 1 below shows pseudo-code for a write barrier (tmWrUTM) in accordance with an embodiment that buffers updates in hardware using an explicit buffered store instruction (movxb). Note that this buffered store instruction differs from a conventional store instruction in that it explicitly stores data in a cache memory, and does not provide for the later writing of the data to memory. Instead, instructions executed during a commit process of a transaction would effect such writing. The write barrier uses the buffered property to filter redundant write barrier operations by first checking whether the buffered block (BBLK) containing the written location is already buffered. If the block is not buffered, the barrier acquires a STM write lock on the location to avoid conflicts with other STM transactions and sets a write monitor to acquire ownership of the block (which allows the transaction to later commit the buffered update). The barrier acquires both the STM write lock and the write monitor as soon as it is about to write a BBLK for the first time (i.e., at encounter time). This encounter time scheme may be referred to as eager locking and eager write monitoring.

Note that the loss of a buffered or write monitored cache line causes a transaction to lose its updates and thus causes the transaction to abort. In one embodiment, commitment of the transaction may be responsive to a user-level transaction commitment instruction (TXCOMWM) to make buffered updates visible if no write-monitored lines are lost.

The loss of a buffered cache line may cause reads to access inconsistent data. A read barrier (tmRdUTM) (also shown in Table 1) may ensure that it does not read from a buffered block that was previously buffered and then subsequently lost. In other words, the read barrier may operate to catch a read-after-buffered-write in which the buffered block was lost before the read. This data inconsistency can be avoided by jumping to an event handler such as an ejection handler (also referred to as an ejector) when the buffered block is lost and before the read accesses the lost BBLK. Without an ejector, however, the read barrier may perform a check of a status register (e.g., a TSR.LOSS_BF bit of the TSR) explicitly on every read from an unbuffered location on which the transaction already holds a write lock (since the write barrier acquires locks eagerly, only those BBLKs for which the transaction already holds write locks might have been previously buffered). In one embodiment, a CACHE_RESIDENT_WRITES flag, which may be set by a compiler or runtime system on transaction initiation controls whether this check is done. In other implementations, an instruction that quickly checks for loss of buffering (e.g., JLOSS) can also be used for this check. Note that the variables of Table 1, CACHE_RESIDENT_WRITES, CACHE_RESIDENT_READS, UTM_UNDO_FILTERING, EJECTOR_ENABLED, act as flags that control certain policies of the transaction. If CACHE_RESIDENT_WRITES is true, then the write set of the transaction must fit in the cache because buffered writes are being used. If CACHE_RESIDENT_READS is true, then the read set of the transaction also must fit in the cache. If UTM_UNDO_FILTERING is true, then buffered writes are not effected (writes are unbounded) and this flag controls whether an undo log is filtered using hardware metadata. Finally, EJECTOR_ENABLED controls whether ejectors are used; if this is false, the JLOSS instruction (or checkTsrLoss (LOSS_BUF) in Table 1) can be used.

Table 1 below shows pseudo-code of an embodiment for a write barrier with hardware write buffering, eager locking and monitoring in accordance with an embodiment of the present invention, in addition to execution of a read barrier.

TABLE 1

Write buffering TM, eager locking & eager monitoring

```
void tmWrUtm<Type>(TxnDesc* txnDesc,Type* addr,Type value) {
  if (CACHE_RESIDENT_WRITES) {
```

TABLE 1-continued

Write buffering TM, eager locking & eager monitoring

```
  if (testbf(addr) == false) {
    acquireWriteLockUtm(txnDesc,addr);
    setwm(addr);
  }
  movxb<Type>(addr,value);
} else {
  /* unbounded writes */
  if (!UTM_UNDO_FILTERING || movmd_load<Type>(addr) !=
  widen<Type>(0xFF)) {
    acquireWriteLockUtm(txnDesc,addr);
    logUndo<Type>(addr);
    if (UTM_UNDO_FILTERING)
      movmd_store<Type>(addr,widen<Type>(0xFF));
  }
  *addr = value;
  }
}
Type tmRdUtm<Type>(TxnDesc* txnDesc,Type* addr) {
  Type val = *addr;
  if (testrm(addr) == true)
    return val;
  /* filter failure slow path & blended code entry point */
tmRdUtmBlendedCodeEntryPoint<Type>:
  setrm(addr);
  TxnRec* txnRecPtr = getTxnRecPtr(addr);
  TxnRec txnRec = *txnRecPtr;
  val = *addr;
  if (txnRec != txnDesc) {
    while (!validateAndLogUtm(txnDesc,txnRecPtr,txnRec)) {
      /* retry */
      txnRec = *txnRecPtr;
      /* Reloading data unnecessary in aggressive read mode
         Loss of data aborts due to LOSS_RM */
      if (CACHE_RESIDENT_READS == false)
        val = *addr;
    }
  } else if (CACHE_RESIDENT_WRITES &&
EJECTOR_ENABLED == false && checkTsrLoss(LOSS_BF)) {
    abort( );
  }
  return val;
}
```

Note that the read and write barriers described above may be performed during execution of a transaction. In general a transaction may occur by initializing various context associated with the transaction, executing various operations within the transaction and then reaching a commit point, and committing the transaction, if no failure occurs during execution of the transaction. At the commit point, it may be determined whether the transaction can successfully commit and make its updates globally visible to a remainder of the system or whether the transaction must abort for one of various reasons such as a conflict, loss of a hardware property or so forth.

In general, the initialization may include setting an initial state for various context of the transaction. This context may include setting an initial state for a TCR in which various indicators may be set to enable jumping to an event handler such as an ejector on the occurrence of various events. In addition, a TSR may be set to an initial state, e.g., in which various indicators may be set to a reset state to indicate the lack of presence of any such events. Then the transaction may start and a time stamp for operations associated with this transaction may be set to a value of a global time stamp. If no ejection occurs during execution of the transaction, the transaction reaches a commit point. If a cache resident transaction, the transaction may commit and write the updated data from the buffer in the cache to memory if a user-level transaction commit instruction is successful. Otherwise, the transaction aborts. Aborting the transaction may cause an ejection handler to be executed, and one of multiple code paths of the ejection handler may run based on the reason for the transaction failure. The ejection handler may select a new transaction mode and pass control to user code for the selected transaction execution mode, which may be the same or different than the original execution mode. If instead the transaction is not a cache resident transaction, a read set may be validated and the transaction may be rolled back and aborted if the validation fails and any locks that were obtained may be released. As part of this roll back, various buffered lines and monitoring may be cleared. If instead the validation is successful, the transaction may commit and the global time stamp incremented. Note that embodiments are not limited to cache-resident transactions, and transactions in which the read set is unbounded (e.g., read sets not bounded by the cache size) but the write set is bounded (e.g., corresponding to the case where CACHE_RESIDENT_WRITES is true but CACHE_RESIDENT_READS if false in Table 1) can occur.

Table 2 below shows example code for operations performed in transaction start and commit in accordance with an embodiment of the present invention.

TABLE 2

Transaction start, commit, and abort

```
void TmStartUtm(TxnDesc* txnDesc) {
  initLogs(txnDesc);
  txc( );            /* clear monitoring, buffering & metadata */
  int tcrBits = 0;   /* ejector disabled by default */
  if (EJECTOR_ENABLED) {
    movToTEjectIP(EjectIp);  /* Setup ejector IP */
    if (CACHE_RESIDENT_READS)
      tcrBits |= LOSS_RM;    /* Enable ejector on loss of RM */
    if (CACHE_RESIDENT_WRITES)
      tcrBits |= LOSS_BF;    /* Enable ejector on loss of BF */
  }
  movToTcr(tcrBits);  /* Setup Tcr */
  cltsr(TSR_ALL);     /* clear tsr */
  tb( );              /* start transaction */
  txnDesc->timestamp = GlobalTimestamp;
}
Void tmCommitUtm(TxnDesc* txnDesc) {
  if (CACHE_RESIDENT_WRITES) {
    if (txcomwm( ) == false) {
      abort( );
    }
  } else {
    tx( ); /* end the transaction */
  }
  TxnRec myCommitTimestamp = lockedIncrement(&GlobalTimestamp);
  if (myCommitTimestamp == txnDesc->timestamp-1 &&
      validateReadSetUtm(txnDesc) == false)
    tmRollbackAndAbort(txnDesc,myCommitTimestamp);
  releaseWriteLocks(txnDesc,myCommitTimestamp);
  quiesce(txnDesc);
}
abort(TxnDesc* txnDesc) {
  /* Clear buffered lines and clear monitoring
     Too bad we lose the good RM state for cross-transaction optimization
   */
  txc( );
  TxnRec myCommitTimestamp = lockedAdd(&GlobalTimestamp);
  tmRollbackAndAbort(txnDesc,myCommitTimestamp);
}
```

In another embodiment, setting the write monitor and acquiring the STM write lock may be delayed until commit time. This commit time scheme may be referred to as lazy locking and lazy write monitoring. Like the eager locking and monitoring scheme discussed above, this scheme first filters redundant write barrier operations using the buffered property. Unlike the eager scheme, instead of setting the write monitor and acquiring the write lock when a value is to be updated, the address of the location to be written may be appended to a write log so that the write monitor can be set and write lock acquired on commit. Note that the updated value can be stored in the address of the location to be written using a buffered write (e.g., movxb) instruction. In one embodiment, a LAZY_LOCKING flag, e.g., set by a compiler or runtime system may enable this mode.

On commit, the transaction iterates through the locations in its write log, setting the write monitor and acquiring the write lock for each location. After setting the write monitor on each location, the transaction may check for loss of a buffered line (e.g., via a TSR.LOSS_BF bit of the status register) and abort if any buffered lines were lost. If not, the transaction may commit, e.g., using the TXCOMWM instruction, to make buffered updates visible if no write monitored lines were lost.

To avoid read set inconsistency from a read-after-buffered-write to a lost BBLK, the transaction can either use an ejector that ejects on a loss of a buffered line, e.g., a so-called LOSS_BF event, or a check for the loss of a buffered line (e.g., via the TSR.LOSS_BF bit of the status register) may be explicitly performed on every read from an unbuffered BBLK (in contrast to the eager locking scheme, which explicitly checks this bit only when reading from an unbuffered BBLK that the transaction had previously write locked).

By implementing lazy locking in accordance with an embodiment of the present invention, other concurrent transactions can read memory locations that map to the same transactional lock without conflicting as long as they commit before the writing transaction commits. In this way, concurrency may be improved by allowing other transactions to read the updated data concurrently without aborting the transaction. This scheme may also reduce false conflicts due to two transactions updating different locations that map to the same transactional lock.

Figure 4A:
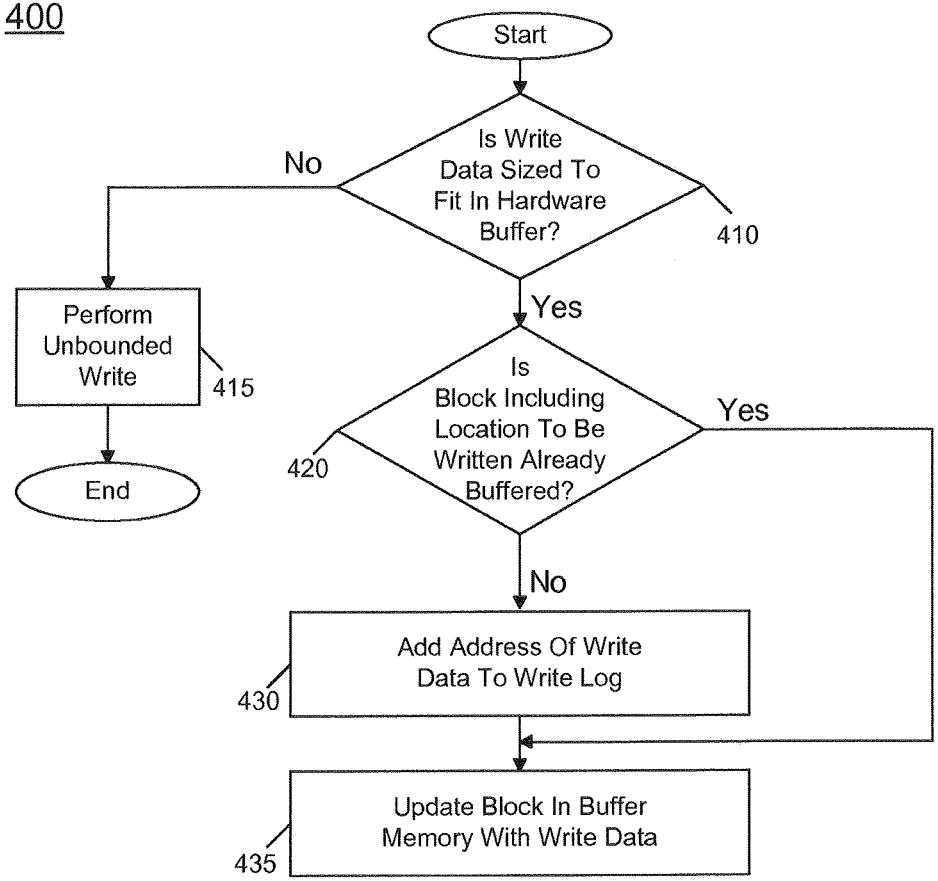
FIG. 4A is a flow diagram of a method for performing lazy write locking and monitoring in accordance with an embodiment of the present invention.

Referring now to FIG. 4A, shown is a flow diagram of a method for performing lazy write locking and monitoring in accordance with an embodiment of the present invention. Similar to the discussion above regarding method 300 of FIG. 3A, method 400 of FIG. 4A is described with reference to a cache resident transaction, although embodiments are not so limited and can apply to any hardware buffer. In general, the flow diagram of FIG. 4A may proceed similarly to that discussed above regarding FIG. 3A, however, note that a write barrier does not occur in a lazy implementation until commit. Specifically as seen in FIG. 4A, method 400 may begin by determining whether write data is sized to fit in a given hardware buffer (diamond 410). If this write would cause an overflow of the buffer, control passes to block 415 for performing an unbounded write transaction.

If the write is sized to fit in the cache, control passes to diamond 420 where a filtering operation may be performed based on whether the block to be written to has previously been buffered. If the block has in fact been buffered, control passes to block 435, where the data may be directly written into the location of the buffer. Thus in a lazy implementation, there is no need to acquire a lock or monitoring at an encounter time. Instead the data is simply updated. When the write monitor is set on a line, the hardware gets exclusive ownership of the line, invalidating other copies in other cores. Setting the write monitor then happens on commit for this lazy case.

If instead the data is not present in the buffer, control passes from diamond 420 to block 430 where the address of the data to be written may be written to a write log. Then the data itself may be updated in the buffer memory, e.g., using a movxb instruction (block 435). In such an embodiment, the update thus performs a buffered store/write to the original write address, causing the hardware to create a private buffered copy of that address that on commit is made globally visible if the write monitor is set on that address. Then additional operations in the transaction may occur.

Figure 4B:
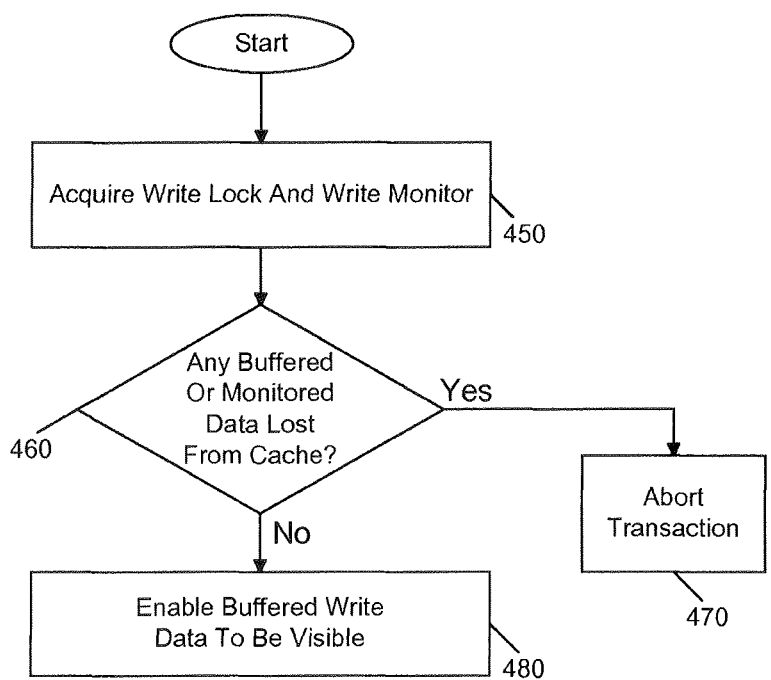
FIG. 4B is a flow diagram of a commit method for a lazy write monitoring and locking transaction in accordance with one embodiment of the present invention.

Referring now to FIG. 4B, shown is a flow diagram of a commit method for a lazy write monitoring and locking transaction in accordance with one embodiment of the present invention. As shown in FIG. 4B, method 440 may proceed to block 450 where a write lock and monitor may be acquired. Such operations may proceed as described with reference to FIG. 3A for the write barrier operation. Once the write lock and monitor are acquired, control passes to diamond 460 to determine whether any buffered or monitored data has been lost. Control passes to one of either blocks 470 or 480, respectively, to abort the transaction (if a loss has occurred) or to commit the transaction and enable global observation of the updated data. While shown with this particular implementation in the embodiment of FIG. 4B, the scope of the present invention is not limited in this regard.

Table 3 below shows pseudo-code of an embodiment for a write barrier with hardware write buffering, lazy locking and lazy monitoring in accordance with an embodiment of the present invention. In general, Table 3 refines the code in Table 1 by adding lazy locking to that table. The flag LAZY_LOCKING controls whether the transaction is using lazy locking and write monitoring (versus eager operations as in Table 1).

TABLE 3

Write buffering TM, lazy locking & lazy monitoring

```
void tmWrUtm<Type>(TxnDesc* txnDesc,Type* addr,Type value) {
  if (CACHE_RESIDENT_WRITES) {
    if (testbf(addr) == false) {
      if (LAZY_LOCKING) {
        /* lazy locking & lazy monitoring */
        logWriteAddr(txnDesc,addr);
      } else {
        /* eager locking & eager monitoring */
        acquireWriteLockUtm(txnDesc,addr);
        setwm(addr);
      }
    }
    movxb<Type>(addr,value);
  } else {
    /* unbounded writes */
    if (!UTM_UNDO_FILTERING || movmd_load<Type>(addr) !=
widen<Type>(0xFF)) {
      acquireWriteLockUtm(txnDesc,addr);
      logUndo<Type>(addr);
      if (UTM_UNDO_FILTERING)
        movmd_store<Type>(addr,widen<Type>(0xFF));
    }
    *addr = value;
  }
}
```

Table 4 below shows pseudo-code of an embodiment for a read barrier with hardware write buffering, lazy locking and lazy monitoring in accordance with an embodiment of the present invention.

TABLE 4

Read buffering TM, lazy locking & lazy monitoring

```
Type tmRdUtm<Type>(TxnDesc* txnDesc,Type* addr) {
  Type val = *addr;
  if (testrm(addr) == true)
    return val;
  /* filter failure slow path & blended code entry point */
  tmRdUtmBlendedCodeEntryPoint<Type>:
  setrm(addr);
  TxnRec* txnRecPtr = getTxnRecPtr(addr);
```

TABLE 4-continued

Read buffering TM, lazy locking & lazy monitoring

```
  TxnRec txnRec = *txnRecPtr;
  val = *addr;
  if (LAZY_LOCKING || txnRec != txnDesc) {
    while (!validateAndLogUtm(txnDesc,txnRecPtr,txnRec)) {
      /* retry */
      txnRec = *txnRecPtr;
      /* Reloading data unnecessary in aggressive read mode
        Loss of data will abort due to LOSS_RM */
      if (CACHE_RESIDENT_READS == false)
        val = *addr;
    }
  } else if (CACHE_RESIDENT_WRITES &&
EJECTOR_ENABLED  == false  && checkTsrLoss(LOSS_BF)) {
    abort( );
  }
  return val;
}
bool checkReadConsistencyUtm(TxnDesc* txnDesc,TxnRec txnRec) {
  /* No explicit consistency checking necessary with ejectors */
  if (EJECTOR_ENABLED)
    return true;
  /* Abort if we lost any buffered data when using lazy locking */
  if (LAZY_LOCKING && checkTsrLoss(LOSS_BF)) {
    abort( );
  }
  if (txnRec > txnDesc->timestamp) {
    /* slow path */
    TxnRec timestamp = GlobalTimestamp;
    if (!checkTsrLoss(LOSS_RM)) {
      txnDesc->timestamp = timestamp;
      return true;
    }
    if (validateReadSetUtm(txnDesc) == false)
      abort( );
    txnDesc->timestamp = timestamp;
  }
  return (txnRec == *txnRecPtr); /* check if txnrec changed */
}
```

Note that write and read buffering described above may be performed during execution of a transaction. Table 5 below shows example code for operations performed in transaction commit in accordance with an embodiment of the present invention implementing lazy locking and lazy monitoring.

TABLE 5

Transaction start, commit, and abort

```
Void tmCommitUtm(TxnDesc* txnDesc) {
  if (CACHE_RESIDENT_WRITES) {
    if (LAZY_LOCKING) {
      /* Lazy locking & lazy monitoring */
      setWriteMonitors(txnDesc);
      /* abort if any buffered lines lost during setting of write monitors */
      if (EJECTOR_ENABLED == false && checkTsrLoss(LOSS_BF))
        abort(txnDesc);
      /* end the transaction to disable ejectors while we acquire locks */
      if (EJECTOR_ENABLED)
        tx( );
      acquireWriteLocks(txnDesc);
    }
    if (txcomwm( ) == false) {
      abort(txnDesc);
    }
  } else {
    tx( ); /* end the transaction */
  }
  TxnRec myCommitTimestamp = lockedIncrement(&GlobalTimestamp);
  if (myCommitTimestamp == txnDesc->timestamp-1 &&
      validateReadSetUtm(txnDesc) == false)
    tmRollbackAndAbort(txnDesc),myCommitTimestamp);
  releaseWriteLocks(txnDesc,myCommitTimestamp);
  quiesce(txnDesc);
}
```

TABLE 5-continued

Transaction start, commit, and abort

```
Void setWriteMonitors(TxnDesc* txnDesc) {
  for (addr in txnDesc->writeAddrs) {
    setwm(addr);
  }
}
Void acquireWriteLocks(TxnDesc* txnDesc) {
  for (addr in txnDesc->writeSet) {
    TxnRec* txnRecPtr = getTxnRecPtr(addr);
    TxnRec txnRec = *txnRecPtr;
    if (txnRec == txnDesc)
      continue;
    While (isWriteLocked(txnRec) ||
        !checkReadConsistency(txnDesc,txnRecPtr,txnRec) ||
        !CAS(txnRecPtr,txnRec,txnDesc)) {
      /* contention slow path */
      handleContention(...);
      txnRec = *txnRecPtr;
    }
    logWriteLock(txnDesc,txnRecPtr);
  }
}
```

Note that a lazy locking and write monitoring scheme detects write-write conflicts late during conflict. That is, two transactions do not discover that they conflicted by writing to the same block until one of them reaches the commit stage. Lazy conflict detection, therefore, can lead to wasted work in the presence of write-write conflicts. In another embodiment, this downside can be alleviated by acquiring locks lazily (which does not abort readers that read the same data before the writer or reader whose data mapped to the same transactional lock) while setting write monitoring eagerly. This technique can be referred to as lazy locking with eager write monitoring. In this technique, the write barrier acquires write locks lazily on commit but sets the write monitor on written data eagerly at encounter time. In general, the methods described above regarding FIGS. 3A-4B can be combined to realize this implementation. That is, a write monitor can be set at the same time that an update is written to a write log to accomplish the eager monitoring. The lazy locking, however occurs as in FIG. 4B at the time of commit.

Table 6 below shows pseudo-code of an embodiment for a write barrier with hardware write buffering, lazy locking and eager monitoring in accordance with an embodiment of the present invention.

TABLE 6

Write buffering TM

```
void tmWrUtm<Type>(TxnDesc* txnDesc,Type* addr,Type value) {
  if (CACHE_RESIDENT_WRITES) {
    if (testbf(addr) == false) {
      if (LAZY_LOCKING) {
        if (EAGER_MONITORING) {
          /* lazy locking & eager monitoring */
          logWriteAddr(txnDesc,addr);
          setwm(addr);
        } else
          /* lazy locking & lazy monitoring */
          logWriteAddr(txnDesc,addr);
      } else {
        /* Eager locking & eager monitoring */
        acquireWriteLockUtm(txnDesc,addr);
        setwm(addr);
      }
    }
    movxb<Type>(addr,value);
  } else {
    /* unbounded writes */
    if (!UTM_UNDO_FILTERING ||
```

TABLE 6-continued

Write buffering TM

```
    movmd_load<Type>(addr) != widen<Type>(0xFF)) {
    acquireWriteLockUtm(txnDesc,addr);
    logUndo<Type>(addr);
    if (UTM_UNDO_FILTERING)
      movmd_store<Type>(addr,widen<Type>(0xFF));
  }
  *addr = value;
  }
}
```

Table 7 below shows example code for operations performed in transaction start and commit in accordance with an embodiment of the present invention implementing lazy locking and eager monitoring.

TABLE 7

Transaction start, commit, and abort

```
Void tmCommitUtm(TxnDesc* txnDesc) {
  if (CACHE_RESIDENT_WRITES) {
    if (LAZY_LOCKING) {
      if (EAGER_MONITORING == false) {
        /* Lazy locking & lazy monitoring */
        setWriteMonitors(txnDesc);
        /* abort if any buffered lines lost during setting of write monitors */
        if (EJECTOR_ENABLED == false && checkTsrLoss(LOSS_BF))
          abort(txnDesc);
      }
      /* end the transaction to disable ejectors while we acquire locks */
      if (EJEcTOR_ENABLED)
        tx( );
      acquireWriteLocks(txnDesc);
    }
    /* commit write monitored lines and end the transaction */
    if (txcomwm( ) == false) {
      abort(txnDesc);
```

TABLE 7-continued

Transaction start, commit, and abort

```
  }
  } else {
    /* unbounded writes */
    tx( ); /* end the transaction */
  }
  TxnRec myCommitTimestamp = lockedIncrement(&GlobalTimestamp);
  if (myCommitTimestamp == txnDesc->timestamp-1 &&
```

TABLE 7-continued

Transaction start, commit, and abort

```
    validateReadSetUtm(txnDesc) == false)
      tmRollbackAndAbort(txnDesc),myCommitTimestamp);
    releaseWriteLocks(txnDesc,myCommitTimestamp);
    quiesce(txnDesc);
}
```

In certain embodiments write monitoring state may be maintained and reused across transactions. In such embodiments write monitors can be maintained on cache lines in case a next transaction also uses hardware buffering. This optimization may be implemented using eager write monitoring and write barriers modified to use the write monitor instead of the buffered property as the filter. In other words, if a write monitor is present for a given location, there is no need to perform another write barrier. That is, no locking is needed on write monitors that have persisted as this persistence guarantees no other transaction has conflicted (read or write) with the line whose write monitor is still set. With reference back to the flow chart of FIG. 3A, instead of determining whether a block is already buffered (at diamond 320), it may instead be determined whether the block is write monitored.

As mentioned above, embodiments may be used in connection with an object-based TM system such as those found in managed environments to accelerate write barrier operations. In Table 8, the column "Source" indicates the source, the second column shows operations performed by a conventional STM, and the third column shows use of hardware properties as implemented on an object-based transaction in a UTM system. Table 8 shows an accelerated write barrier for eager data monitoring and both lazy and eager locking.

TABLE 8

| Source | Write barrier | Write barrier with HW buffering |
|---|---|---|
| obj.f = t; | txnOpenForWrite(obj);<br>txnUndoLog(&obj.f);<br>_obj.f = t; | txnOpenForWrite[NoLock,NoLog](obj);<br>setwm(&obj.f);<br>movxb(&obj.f,t); |
| OpenForWrite | OpenForWrite<br>No locking | OpenForWrite<br>No logging, no locking |
| txnOpenForWrite(th, obj) {<br>  TMW * tmw = txnGetLock(obj);<br>  if (!isUnLocked(tmw) \|\|<br>    !acquireLock(tmw))<br>    handleConflict(obj);<br>  writeLog(obj);<br>} | txnOpenForWriteNoLock(th, obj) {<br>  TMW * tmw =<br>  txnGetLock(obj);<br>  while (!isUnLocked(tmw))<br>    handleConflict(obj);<br>  writeLog(obj);<br>} | txnForWriteNoLog(th, obj) {<br>  TMW * tmw =<br>  txnGetLock(obj);<br>  Setwm(tmw);<br>  int v = *tmw;<br>  if (!isUnLocked(tmw))<br>    handleConflict(obj);<br>  if (versionOveflow(v+1))<br>    handleVersionOverflow(obj);<br>  movxb(tmw,v+1);<br>} |

In Table 8, the txnOpenForWrite functions acquire a write lock on the object being written. As seen, there can be different variants of this function. Specifically shown are two variants, one that does not acquire the lock but simply logs the object (NoLock), and another variant (NoLog) that neither locks nor logs the object but increments the transactional version number of the object using a buffered store.

In yet other implementations, a hardware write buffering write barrier acquires write locks lazily (at commit time) and sets write monitoring on accessed data lazily. This allows other readers of the data to proceed without aborting the transaction (i.e., without causing loss of write monitoring). A log of written BBLKs may be provided to enable setting the write monitors at commit time. A function txnLogBblk (shown in the pseudo-code of Table 9) may perform this logging, in one embodiment. On commit, the transaction iterates through this log and sets write monitoring on all the buffered lines. The barrier sets the read monitor on the written MBLK to catch conflicting writes by other transactions. Commit fails if the transaction has lost any read-monitored or write-monitored MBLKs. If not, commitment may proceed and a user-level commit instruction (e.g., TXCOMWMRM) may be used to commit its buffered data. This barrier allows multiple processors to have the same line in the buffered state at the same time (using the read monitored and buffered R-B state) and detect write-write conflicts lazily on commit.

TABLE 9

| Source | Write barrier | Write barrier with HW buffering |
|---|---|---|
| obj.f = t; | txnOpenForWrite(obj); txnUndoLog(&obj.f); _obj.f = t; | txnOpenForWrite[NoLock](obj); tnxLogBBlk(&obj.f); setrm(&obj.f); movxb(&obj.f,t); |

As discussed above, STM systems that use lazy version management buffer all updates performed inside a transaction. Lazy versioning STM systems redirect each update to a memory location or object L to a shadow copy of L which may be in memory and not in a hardware buffer. Such STMs need to access the shadow copy of L on each memory read or write, adding significant overhead, especially in STM systems that perform optimistic writes.

Embodiments may use a hardware metadata facility to implement a low cost way to find the shadow copy of a memory location or object. As described above, hardware metadata can provide a fast but lossy way of associating metadata to an address. As used here, the metadata can store a pointer to the shadow copy of an object or address, reducing the overhead of accessing shadow copies.

Figure 5:
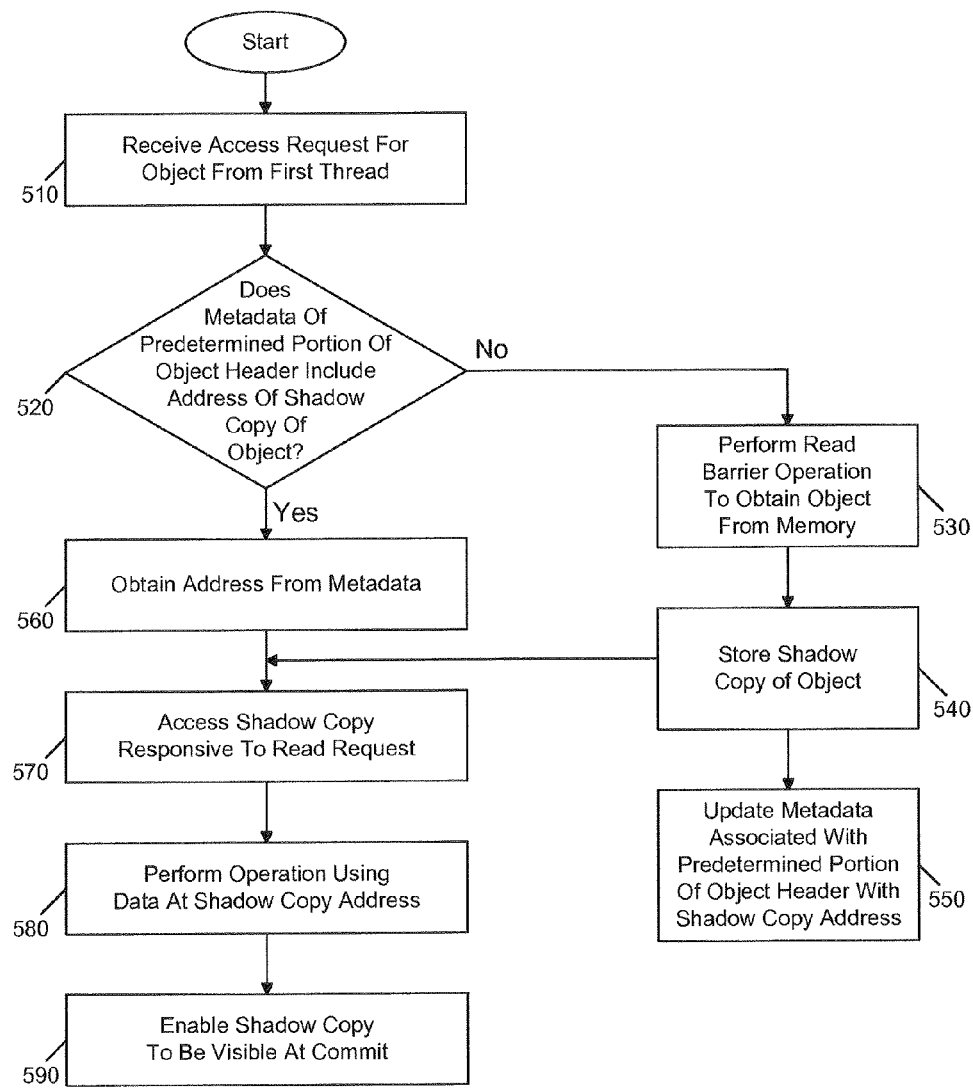
FIG. 5 is a flow diagram of a method of using metadata to efficiently determine a location of a shadow copy of an object in accordance with one embodiment of the present invention.

Referring now to FIG. 5, shown is a flow diagram of a method of using metadata to efficiently determine a location of a shadow copy of an object. That is, embodiments may use a metadata property to perform efficient mapping to a shadow copy. As seen in FIG. 5, method 500 may begin by receiving an access request (e.g., a read or write request) to an object from a first thread (block 510). As an example, this thread may be performing a transaction in any type of TM scheme. Control passes to diamond 520 where it may be determined whether metadata that corresponds to a predetermined portion of an object header for the object includes an address of a shadow copy of the object (diamond 520). As one example, this predetermined portion may be a metadata portion that is associated with a first slot of the object header. If not, this indicates that there is no shadow copy of the object. Accordingly, control passes to block 530 where a read barrier operation may be performed to obtain the object from memory. Then the shadow copy of the object may be stored (if a write transaction) (block 540). While the scope of the present invention is not limited in this regard, for a transaction that is cache resident, the shadow copy may be stored in a buffer of a cache memory of the processor. In connection with storing this access request, control may also pass to block 550 where the metadata associated with this portion of the object header may be updated. Specifically, this metadata may store the shadow copy address. In this way, future accesses to a location in the object may efficiently access the shadow copy by using a mapping operation in accordance with an embodiment of the present invention.

Still referring to FIG. 5, if instead at diamond 520, it is determined that the metadata includes the address, the address may be obtained from the metadata (block 560) and used to access the shadow copy (block 570). Note that if the access is a read operation and the object has never been written to before, the read operation would read directly from the original object rather than the shadow object. Accordingly, responsive to the access request the location of the shadow copy can be obtained from the metadata when it is present. For example, for a write transaction the data that is accessed at the shadow may be used in performing an operation (block 580). For example, the data may be used to perform various calculations or other operations in furtherance of a given transaction. At conclusion of a write transaction, the shadow copy may be enabled to be visible. That is, at commit if the transaction successfully completes and there is no loss of any of the buffered information and no contention occurs (and no other semantics have been violated), the transaction may commit and the data stored in the shadow copy may be made visible to other threads such as described above with regard to the commit operations of FIGS. 3B and 4B.

Note that a similar process to that shown in FIG. 5 may be performed for a write request, e.g., as part of a write barrier. However, note that there are several differences. First, for the write barrier, metadata associated with a different predetermined portion of the object header (e.g., a second slot) may instead be accessed to determine whether the address is present. Second, if the address is not present in the metadata and the object is accessed and stored to a shadow copy, the metadata associated with both the first and second predetermined portions of the object header may be updated with the address of the shadow data such that both read and write barriers can be filtered going forward. While shown with this particular implementation in the embodiment of FIG. 5, the scope of the present invention is not limited in this regard.

The pseudo-code of Table 10 below shows read and write barriers for an object-based, lazy versioning STM system that does not maintain read set consistency (such as for a managed code system) but uses metadata. As seen, the "Source" column shows the read and write operations. The "Software TM" column shows the respective STM read and write barrier pseudo-code. The "txnOpenForWrite" function creates and returns a shadow copy of the object. This function will also acquire an exclusive lock on the object if the STM system performs encounter-time locking; otherwise, it delays acquiring the lock until commit time. The function "txnOpenFor-Read" returns the shadow copy of the object if the transaction has previously written to the object; otherwise, it returns the shared object. This function also logs the object into the read set and may use either optimistic or pessimistic concurrency control for reads. Note that the pseudo code cannot maintain read set consistency in an STM system that uses optimistic concurrency control for reads, as maintaining consistency in an optimistic system requires re-validating the object after reading the field.

The "Accelerated TM" column of Table 10 shows the pseudo-code that uses metadata to accelerate STM operations. The read barrier first checks the metadata associated with a predetermined portion of the object header (e.g., the first slot) and then performs a txnOpenForRead operation if that metadata contains a null value. It then stores the address returned by this function into the object's metadata associated with the predetermined portion, which causes subsequent read barriers to the same object to skip over the txnOpenFor-Read operation (effectively filtering redundant read barriers). The write barrier similarly first checks the metadata associated with a different predetermined portion of the object header (e.g., the second slot) and then performs a txnOpen-ForWrite operation if that metadata contains a null value. It then stores the address returned by this function into the metadata associated with both predetermined portions (e.g., the first two slots) of the object header, which causes subsequent read and write barriers to the same object to skip over their respective barrier operations. Note that this algorithm assumes that the minimum object size can store two pointer values. Another implementation of a write barrier can support a minimum object size that can store only one pointer value but at the cost of an extra comparison in the fast path. Compared to conventional STM read and write barriers, the accelerated barriers incur the overhead of only the metadata load and (1 or 2) condition branch instructions when the metadata "hits".

TABLE 10

| Source | Software TM | Accelerated TM |
|---|---|---|
| t = obj.f; | __obj = txnOpenForRead(obj); t = __obj.f; | __obj = movmd__load(&obj.hdr0); if (!__obj) { __obj = txnOpenForRead(obj); movmd__store(&obj.hdr0,__obj); } t = __obj.f; |
| obj.f = t; | __obj = txnOpenForWrite(obj); __obj.f = t; | __obj = movmd__load(&obj.hdr1); if (!__obj) { __obj = txnOpenForWrite(obj); movmd__store(&obj.hdr1,__obj); movmd__store(&obj.hdr0,__obj); } |

TABLE 10-continued

| Source | Software TM | Accelerated TM |
|---|---|---|
| | | __obj.f = t; __obj = movmd__load(&obj.hdr0); if (!__obj || __obj == obj) { __obj = txnOpenForWrite(obj); movmd__store(&obj.hdr0,__obj); } __obj.f = t; |

Note that this pseudo-code of Table 10 can result in granular lost updates (GLU) and granular inconsistent reads (GIR) if non-transactional threads are allowed to update the same object that is being accessed by a transaction. An STM system therefore typically employs strong atomicity barriers in non-transactional code to avoid such problems or prohibit updates to transactional objects by non-transaction threads (separation). Another embodiment of the present invention can use metadata to accelerate a shadow copy lookup of objects in lazy versioning STMs that do not require strong atomicity or separation to avoid GLU or GIR problems.

Table 11 shows pseudo-code for read and write barriers for an address-based, lazy versioning STM system using hardware metadata that maintains read set consistency (such as for a C/C++ STM system). The algorithm is more complicated than the previous object-based algorithm because it avoids GLU and GIR problems and because accesses in native code may span blocks. In native code, there are blocks of memory instead of objects, so the system makes shadow copies of blocks rather than objects. A memory read or write might then access a memory value that spans two different blocks, so the access would involve finding two different shadow copies. The code in Table 11 detects this case and simply calls the underlying STM txnOpenAddrForRead and txnOpenAddrForWrite functions.

TABLE 11

| Source | Software TM | Accelerated TM |
|---|---|---|
| t = *ptr; | __ptr = txnOpenAddrForRead(ptr); t = *__ptr; if (ptr == __ptr) postValidateRead(ptr); | if (spansBlk(ptr,sizeof(*ptr)) { __ptr = txnOpenAddrForRead(ptr); } else { __ptr = movmd__load(blkAddr(ptr)); if (!__ptr) { __ptr = txnOpenAddrForRead(ptr); movmd__store(blkAddr(ptr),blkAddr(__ptr)); } else if (ptr != __ptr) __ptr = txnOpenShadowForRead(__ptr,ptr); } t = *__ptr; if (ptr == __ptr) postValidateRead(ptr); |
| *ptr = t; | __ptr = txnOpenAddrForWrite(ptr); *__ptr = t; | if (spansBlk(ptr,sizeof(*ptr)) { __ptr = txnOpenAddrForWrite(ptr); } else { __ptr = movmd__load(blkAddr(ptr)); if (!__ptr || __ptr == (blkAddr(ptr)) { __ptr = txnOpenAddrForWrite(ptr); movmd__store(blkAddr(ptr),blkAddr(__ptr)); } else __ptr = txnOpenShadowForWrite(__ptr,ptr); } *__ptr = t; |

Thus in various embodiments, different techniques can be used to realize more efficient transactions by using hardware properties of a UTM system. These techniques may include commit time (lazy) write monitoring with commit time (lazy) locking, or encounter time (eager) write monitoring with commit time (lazy) or encounter time (eager) locking. Still further, embodiments may enable maintaining consistency using an ejector and/or by using explicit checks of a transaction status register that tracks loss of buffered or monitored lines (or using an explicit instruction). Still further, cache-resident writes with both cache-resident and unbounded reads can be performed, and both optimistic (timestamp-based) and pessimistic (reader-writer lock based) concurrency control for reads can be implemented.

To allow filtering of write locking, with or without write logging, write monitors may be maintained across transactions. Cache-resident writes may occur with both an in-place update and write-buffering STM for unbounded transactions. Further in connection with an implicit-mode handler-based system in which buffered updates and filter checks are done implicitly by hardware, the lack of a filter invokes a handler that performs the write barrier. Embodiments may thus reduce the overhead of conventional STM systems by performing version management in hardware for transactions whose write set fits in hardware buffers (such as the cache).

Embodiments may also reduce software overheads incurred in lazy versioning STM systems for looking up the shadow copy of an object or data item. Such overhead may be reduced using hardware support, e.g., hardware metadata to lookup a location of the shadow copy of an object or location.

Figure 6:
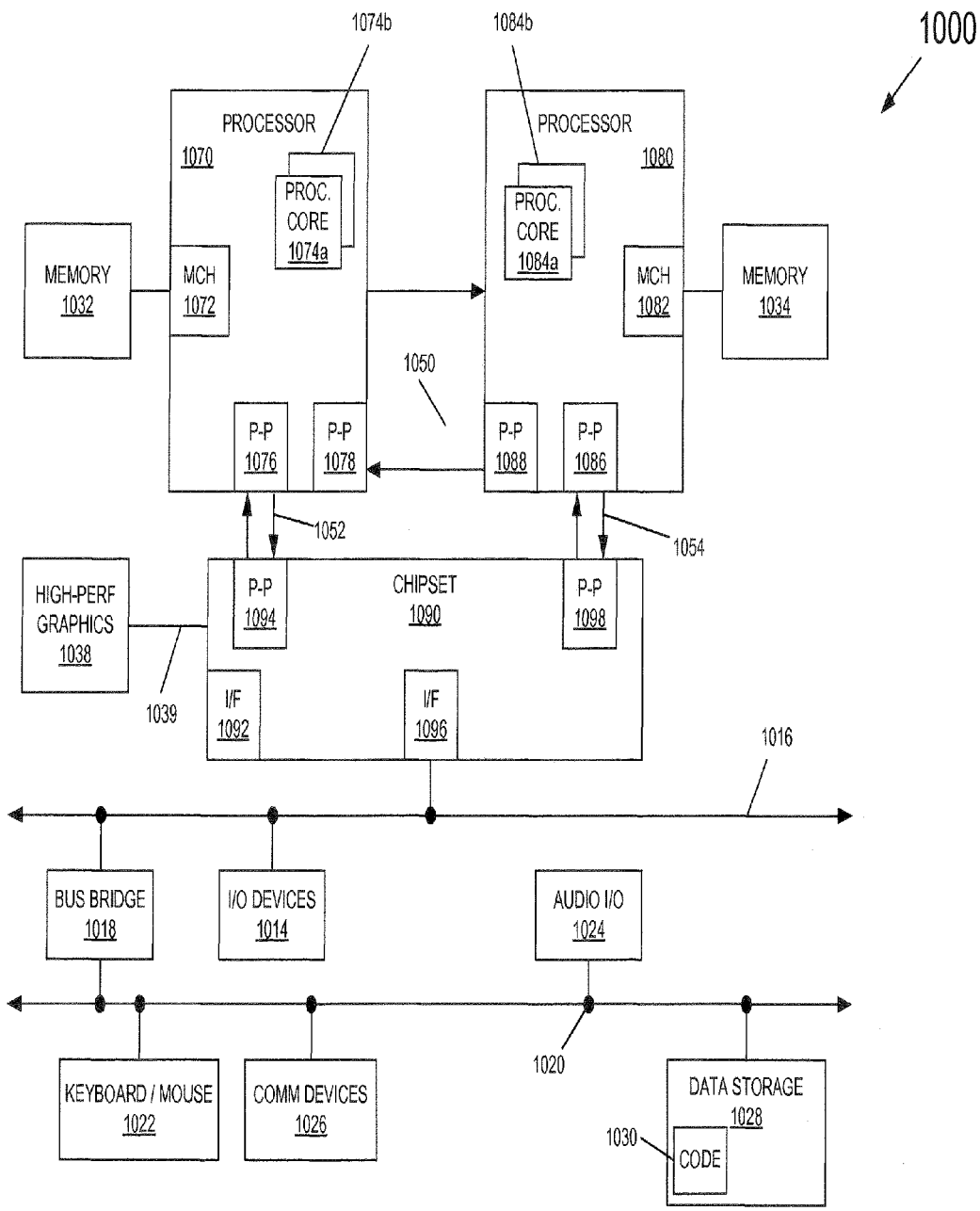
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 1000 is a point-to-point interconnect system, and includes a first processor 1070 and a second processor 1080 coupled via a point-to-point interconnect 1050. As shown in FIG. 6, each of processors 1070 and 1080 may be multicore processors, including first and second processor cores (i.e., processor cores 1074*a* and 1074*b* and processor cores 1084*a* and 1084*b*), although potentially many more cores may be present in the processors. The processor cores may execute TM transactions using hardware, software, or combinations thereof to enable efficient unbounded transactions.

Still referring to FIG. 6, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 6, MCH's 1072 and 1082 couple the processors to respective memories, namely a memory 1032 and a memory 1034, which may be portions of main memory (e.g., a dynamic random access memory (DRAM)) locally attached to the respective processors. First processor 1070 and second processor 1080 may be coupled to a chipset 1090 via P-P interconnects 1052 and 1054, respectively. As shown in FIG. 6, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 6, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a disk drive or other mass storage device which may include code 1030, in one embodiment. Further, an audio I/O 1024 may be coupled to second bus 1020.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine-readable medium comprising one or more instructions that when executed by a processor:

during execution of a transactional memory (TM) transaction, store data at a location of a block stored in a cache memory of the processor if the block is present in the cache memory, using a user-level buffered store instruction to store the data, wherein the user-level buffered store instruction enables the data to be stored in the cache memory but not to be later written to a system memory;

otherwise store the data at a first location, and store an address of the first location of the stored data in a write log; and acquire a write monitor for the block at commitment of the TM transaction and commit the TM transaction if no data in the write monitored block was lost.

2. The at least one non-transitory machine-readable medium of claim 1, further comprising instructions that when executed enable the processor to acquire the write monitor at encounter time instead of at the commitment when an eager mode of the TM transaction is active.

3. The at least one non-transitory machine-readable medium of claim 2, further comprising instructions that when executed enable the processor to update a monitor indicator of a header of the block corresponding to a first thread to indicate ownership of the write monitor on the block by the first thread.

4. The at least one non-transitory machine-readable medium of claim 3, further comprising instructions that when executed enable the processor to use a user-level write monitor instruction to update the monitor indicator of the block.

5. The at least one non-transitory machine-readable medium of claim 2, further comprising instructions that when executed enable the processor to maintain the write monitor after committing the TM transaction and use the write monitor in a second TM transaction.

6. The at least one non-transitory machine-readable medium of claim 1, further comprising instructions that when executed enable the processor to perform a user-level test instruction on the first location to determine whether the write monitor has been acquired.

7. The at least one non-transitory machine-readable medium of claim 1, further comprising instructions that when executed enable the processor to determine at commitment whether any buffered block was lost based on an indicator in a transaction status register (TSR), abort the TM transaction if any buffered block was lost, and select a transaction execution mode for re-execution of the TM transaction.

8. A method comprising:

during execution of a transactional memory (TM) transaction, storing data at a location of a block stored in a cache memory of a processor if the block is present in the cache memory, using a user-level buffered store instruction to store the data, wherein the user-level buffered store instruction enables the data to be stored in the cache memory but not to be later written to a system memory; otherwise storing the data at a first location, and storing an address of the first location of the stored data in a write log; and acquiring a write monitor for the block at commitment of the TM transaction and committing the TM transaction if no data in the write monitored block was lost.

9. The method of claim 8, further comprising acquiring the write monitor at encounter time instead of at the commitment when an eager mode of the TM transaction is active.

10. The method of claim 9, wherein acquiring the write monitor includes updating a monitor indicator of a header of the block corresponding to a first thread to indicate ownership of the write monitor on the block by the first thread.

11. The method of claim 10, further comprising acquiring the write monitor using a user-level write monitor instruction to update the monitor indicator of the block.

12. The method of claim 8, further comprising performing a user-level test instruction on the first location to determine whether the write monitor has been acquired.

13. The method of claim 8, further comprising determining at commitment whether any buffered block was lost based on an indicator in a transaction status register (TSR), aborting the TM transaction if any buffered block was lost, and selecting a transaction execution mode for re-execution of the TM transaction.

14. The method of claim 8, further comprising maintaining the write monitor after committing the TM transaction and using the write monitor in a second TM transaction.

15. A system comprising:
a processor including a plurality of cores each associated with a first cache memory and a second cache memory; and
a dynamic random access memory (DRAM) coupled to the processor and including instructions that enable the processor to, during execution of a transactional memory (TM) transaction, store data at a location of a block stored in the first cache memory if the block is present in the first cache memory, using a user-level buffered store instruction to store the data, wherein the user-level buffered store instruction enables the data to be stored in the first cache memory but not to be later written to a system memory, otherwise store the data at a first location, and store an address of the first location of the stored data in a write log, and acquire a write monitor for the block at commitment of the TM transaction and commit the TM transaction if no data in the write monitored block was lost.

16. The system of claim 15, further comprising instructions that when executed enable the processor to acquire the write monitor at encounter time instead of at the commitment when an eager mode of the TM transaction is active.

17. The system of claim 15, further comprising instructions that when executed enable the processor to perform a user-level test instruction on the first location to determine whether the write monitor has been acquired.

18. The system of claim 15, further comprising instructions that when executed enable the processor to determine at commitment whether any buffered block was lost based on an indicator in a transaction status register (TSR), abort the TM transaction if any buffered block was lost, and select a transaction execution mode for re-execution of the TM transaction.

* * * * *